(12) United States Patent
Volk et al.

(10) Patent No.: US 9,672,246 B1
(45) Date of Patent: Jun. 6, 2017

(54) TIME-VARYING DATA RETRIEVAL

(71) Applicant: CA, INC., Islandia, NY (US)

(72) Inventors: David Arthur Volk, Rohnert Park, CA (US); Arijit Dey, Hyderabad (IN)

(73) Assignee: CA, INC., New York, NY (US)

( * ) Notice: Subject to any disclaimer, the term of this patent is extended or adjusted under 35 U.S.C. 154(b) by 421 days.

(21) Appl. No.: 14/020,789

(22) Filed: Sep. 7, 2013

(51) Int. Cl.
  *G06F 7/00* (2006.01)
  *G06F 17/30* (2006.01)
(52) U.S. Cl.
  CPC .............................. *G06F 17/30424* (2013.01)
(58) Field of Classification Search
  CPC ........ G06F 17/30424; G06F 17/30398; G06Q 30/02; G06Q 30/0254
  USPC .......................... 707/735, 769, 770, 999.003
  See application file for complete search history.

(56) References Cited

U.S. PATENT DOCUMENTS

| | | | | |
|---|---|---|---|---|
| 6,148,308 A * | 11/2000 | Neubauer | ............. | G06F 17/212 707/695 |
| 2002/0184069 A1* | 12/2002 | Kosiba | ................... | G06Q 10/04 705/7.38 |
| 2004/0148216 A1* | 7/2004 | Waddington | ..... | G06Q 10/06375 705/7.37 |
| 2004/0267714 A1* | 12/2004 | Frid | ....................... | G06Q 30/02 |
| 2006/0106763 A1* | 5/2006 | Dirisala | ............ | G06F 17/30398 |
| 2009/0112928 A1* | 4/2009 | Hoyt | ................... | G06F 17/30914 |
| 2010/0017251 A1* | 1/2010 | Rawle | .................. | G06Q 10/063 705/7.11 |
| 2011/0119300 A1* | 5/2011 | Marcade | ........... | G06F 17/30286 707/769 |
| 2011/0179085 A1* | 7/2011 | Hammerschmidt | | G06F 17/30935 707/797 |

\* cited by examiner

*Primary Examiner* — Md. I Uddin
(74) *Attorney, Agent, or Firm* — Vierra Magen Marcus LLP

(57) ABSTRACT

Methods for determining the representation of time-dependent attributes stored in a database and extracting data according to the representation of the time-dependent attributes are described. In some cases, a time-dependent attribute may comprise a time scale varying attribute (TSV) in which a sum may be computed for any date range. In some embodiments, a time-dependent attribute may be represented as a Character Large Object (CLOB) that encodes information about the time-dependent attribute in a text string and may be accessed by table functions. Alternatively, some time-dependent attributes may also be represented as Binary Large Objects (BLOBs) that are used to populate timeslicing tables. Upon receiving a query for data pertaining to a stored time-dependent attribute, a system identifies whether the stored time-dependent attribute is represented as a CLOB or a BLOB, and generates the queried data in a manner dependent on the representation of the time-dependent attribute.

16 Claims, 5 Drawing Sheets

TIME-VARYING DATA RETRIEVAL

BACKGROUND

The present disclosure relates to the storage and retrieval of time-dependent data.

Database management systems allow an end user to query and analyze data stored in a database. A database is not generally portable across different database management systems, but different database management systems may use various standards (e.g., SQL) to allow an application, such as a project management application, to work with more than one database. SQL comprises a special-purpose programming language used for accessing and managing databases. A project management application may be used to manage resources available to an enterprise (e.g., people and money) and provide resource estimates for projects (e.g., budget estimates). A project management application may store, manage, and analyze information that varies over time such as resource availability, project allocation, and project budgets.

BRIEF SUMMARY

According to one aspect of the present disclosure, technology for the retrieval of time-varying data represented as a character large object or binary large object is disclosed.

One embodiment comprises a method for presenting a data value associated with time-dependent data stored in a database, acquiring a query for a data value, and identifying a set of attributes to retrieve based on the query. The set of attributes comprises the time-dependent attribute. The method further comprises retrieving the set of attributes from the database, determining a set parameters associated with the query, generating a data value based on the set of parameters, and outputting the data value. The generating the data value comprises generating a plurality of segments by applying a slicing function to the retrieved set of attributes.

One embodiment comprises a system comprising a storage device, a processor in communication with the storage device, and a query interface. The storage device supports a database for storing data. The processor programmed to populate the database with data pertaining to a time-dependent attribute, acquire a query from the query interface, and identify a set of attributes to retrieve from the database based on the query. The set of attributes comprises the time-dependent attribute. The processor retrieves the set of attributes from the database, determines a set of parameters associated with the query, generates a plurality of segments by applying a slicing function to the retrieved time-dependent attribute, and generates a data value based on the set of parameters and the plurality of segments.

One embodiment comprises a computer program product comprising a computer readable storage medium having computer readable program code embodied therewith. The computer readable program code configured to determine a data representation for a time-dependent attribute based on a historical rate of data updates associated with the time-dependent attribute, populate a database with the time-dependent attribute based on the data representation, process a query for a data value, and identify a set of attributes to retrieve based on the query. The set of attributes comprises the time-dependent attribute. The computer readable program code configured to retrieve the set of attributes from the database, generate the data value based on a plurality of segments generated by applying a slicing function to the retrieved set of attributes, and output the data value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
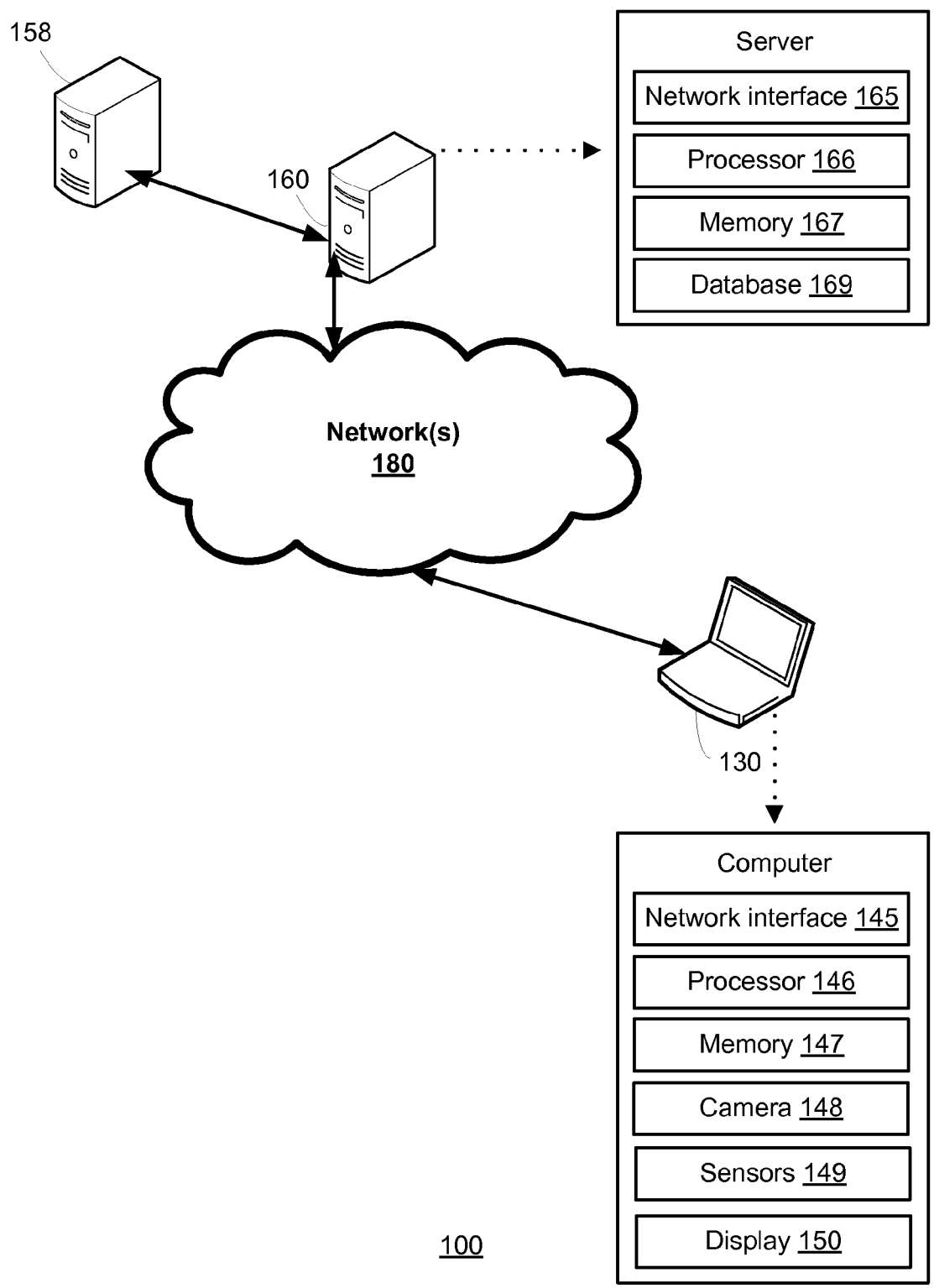
FIG. 1 depicts one embodiment of a networked computing environment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET or the like, conventional procedural programming languages, such as the "C" programming language, Visual Basic, Fortran 2003, Perl, Python, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Technology for determining the representation of time-dependent attributes stored in a database and obtaining data according to the representation of the time-dependent attributes are described. A time-dependent attribute may include numeric data that varies over time. In some cases, a time-dependent attribute may comprise a time scale varying attribute (TSV) in which a sum may be computed for any date range and/or any level of granularity. In one example, a TSV attribute may be used to record a budget for a project using data corresponding with a weekly or monthly basis. In this case, a sum may be calculated for the TSV attribute based on a date range less than the smallest time scale for which the data was entered and/or across a time boundary for which the data was entered (e.g., if data corresponds with a weekly basis, then a sum may be computed over a three day period or a nine day period). In some embodiments, a time-dependent attribute may be represented as a Character Large Object (CLOB) that encodes information about the time-dependent attribute in a text string and may be accessed by table functions. A CLOB may comprise a collection of character data stored in a database management system. In other embodiments, the time-dependent attribute may be represented as a text string and be stored and accessed using a Variable Character Field (VARCHAR). Alternatively, some time-dependent attributes may also be represented as Binary Large Objects (BLOBs) that contain time-varying information such as a varying allocation rate over a time period (e.g., where each segment stores a start time, a finish time, and a rate). A BLOB may comprise a collection of binary data stored in a database management system. Upon receiving a query for data pertaining to a stored time-dependent attribute, a system identifies whether the stored time-dependent attribute (or a component thereof) is represented as a CLOB or a BLOB, and generates the queried data in a manner dependent on the representation of the time-dependent attribute.

A database may store time-varying data representing the availability of resources (e.g., people) to work in projects over time. For example, an employee may be available to perform work at an availability rate of 8 hours per day for the first four days of a week and to perform work at an availability rate of 4 hours per day for the last three days of the week (e.g., Friday, Saturday, and Sunday). In one embodiment, the database may also store other time-varying data representing the resources (e.g., people, money, machines, and/or computers) available to an enterprise over time.

In some embodiments, a TSV attribute may be sliced into timeslicing tables and stored within the database as slice rows keyed by a corresponding time period and granularity. The timeslicing tables may correspond with time-dependent data covering a particular time period on a daily, weekly, and/or monthly basis and be accessible to queries and external database management systems. Although storing time-varying data in timeslicing tables provides flexibility to users to query data directly from the timeslicing tables, storing and maintaining the time-varying data in timeslicing tables may present problems. Depending on the length of time over which the stored time-varying data ranges, timeslicing tables can occupy an enormous amount of server storage space. The generation and updating of timeslicing tables can also take a large amount of time, causing a delay that inconveniences users. Often, users need to be able to quickly access time-varying data ranging over a large length of time in order to make data-intensive decisions. Thus, timeslicing tables may not always be conducive to the needs of users. However, data timeslicing tables, once the timeslicing tables are generated, may quickly be accessed by users, assuming that the data queried by the users falls within the time ranged by the data in the timeslicing tables. Timeslicing tables therefore have advantages and disadvantages that depend on the circumstances in which they are accessed.

For example, in some applications, a corporate user may be interested in how resources, such as the work hours of individual or groups of employees, are allocated across various projects in the portfolio of the corporate user. Time-varying data such as the allocation of employee hours toward a project may be referred to as a time-dependent attribute. Data pertaining to an attribute can be stored in timeslicing tables. Timeslicing tables may store numeric values for arbitrary time periods. The timeslicing tables may be referenced by binary structures called Binary Large Objects (BLOBs). The BLOBs may encode the start time of the period of time over which the data is taken, the finish time of the period of time over which the data is taken, and a rate of the attribute over the period of time over which the data is taken. The set of data pointed to by a BLOB, over which the rate of the attribute is constant, may be referred to as a segment. A set of segments pertaining to a single attribute may be referred to as a curve. Gaps in time may exist between the periods of time covered by segments in a curve. A gap may correspond with a period of time not represented by a segment. For the same attribute, the start time or finish time of one segment is generally not between the start and finish times of another segment. Thus, for a period of time between the start date and finish date encoded by a BLOB, the amount corresponding to an attribute (e.g., number of hours allocated toward a project) can be obtained by subtracting the start date from the finish date, converting to the appropriate unit of time as necessary, and multiplying the rate by this converted difference. Other mathematical operations, such as addition, subtraction, multiplication, division, and scaling are possible with this data. Mathematical operations are also possible between multiple curves. For example, a manager may want to divide the net income generated by a project by the number of hours that an employee has dedicated to this project in order to determine a bonus for this employee.

A user of a database can interact with a BLOB and the data referenced by the BLOB via a portlet, and can receive data generated from the timeslicing tables in the form of a report. Accessing the timeslicing table format and manipulating the data contained therein, however, may require significant overhead. Accessing data in a timeslicing table, for instance, may require initializing sets of segments and performing functions to access data with respect to a desired time period. Depending on the granularity at which the user requests data, a large number of timeslicing tables may have to be generated, consisting of millions of entries and requiring days to generate. These problems may be exacerbated when users make multiple requests within a short period of time, or when the system generating the timeslicing tables detect changes made to the data stored, which requires updating the data generated for the user.

In some embodiments, a CLOB may represent a TSV attribute comprising one or more segments in terms of a rate of the attribute at a segment, the start time of that segment, and the amount of time in, or duration of, that segment. In one example implementation, the start time may be a date represented in Julian format (e.g., the start date may correspond with Julian day number 0), and the amount of time may be a number of days from the start time. In this format, the data encoded in the CLOB can be accessed via table functions common in frameworks such as SQL. The start date may also be represented using other time formats, such as the number of days that have elapsed since Jan. 1, 1970. The table functions (e.g., implemented using SQL functions) may parse portions of the CLOB in order to generate timeslicing tables. In some cases, the table functions may take the time period and the period type (e.g., daily or weekly) as input and then parse the CLOB text to produce slices for the requested time period. Other table functions may return a sum of the slices for a particular time period. The table functions may also take a calendar as input and return slices based on the calendar passed. One benefit of using a CLOB curve to represent a TSV attribute is that the corresponding text may be parsed and retrieved using a standard SQL query.

In some cases, a TSV attribute may correspond with data represented by both a BLOB (or other binary data representation) and a CLOB (or other text string representation). In this case, queried data associated with the TSV attribute may be generated using the CLOB representation if the queried data (or a component thereof) is not directly accessible via timeslicing tables associated with the BLOB representation. In some cases, in order to conserve memory and processing resources, a CLOB representation may be used to consolidate data stored in one or more timeslicing tables upon a data update to the one or more timeslicing tables. For example, a CLOB representation may be generated and stored rather than regenerating and storing a subset of the one or more timeslicing tables based on updated data. In one embodiment, the decision to replace one or more timeslicing tables with a CLOB representation may depend on a history of data access (or a historical rate of data access) to data contained within the one or more timeslicing tables and/or a history of data updates (or a historical rate of data updates). In one example, frequently accessed timeslicing tables (e.g., tables accessed once an hour) may be regenerated while infrequently used timeslicing tables (e.g., tables accessed once a day) may be replaced by a CLOB representation. In another example, infrequently updated but frequently accessed timeslicing tables (e.g., tables updated once a day) may be regenerated while frequently updated timeslicing tables (e.g., tables updated once an hour) may be replaced by a CLOB representation.

FIG. 1 depicts one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include computer 130 and server 160, and more computing devices may be involved in some embodiments of networked computing environment 100. In some embodiments, the plurality of computing devices may include other computing devices not shown. A computing device may comprise various computing devices such as a mobile phone, laptop computer, desktop computer, or tablet computer. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

A server, such as server 160, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 160 includes a network interface 165, processor 166, database 169, and memory 167, all in communication with each other. Network interface 165 allows server 160 to connect to one or more networks 180. Network interface 165 may include a wireless network interface, a modem, and/or a wired network interface. Processor 166 allows server 160 to execute computer readable instructions stored in memory 167 in order to perform processes discussed herein. In one embodiment, server 160 stores time-varying data using CLOBs and/or timeslicing tables in database 169. As a host in the network(s) 180, server 160 is able to receive queries about the time-varying data from computer 130. In return, server 160 can transmit the queried data to computer 130.

In one embodiment, server 158 is connected to server 160. Server 158 may have a similar configuration as server 160. Server 158 may host a virtual machine and store time-varying data that may be accessed by server 160 (e.g., an SQL server). In this case, server 160 may act as an intermediary server for fetching data from server 158 for a user of computer 130.

One embodiment of computer 130 includes a network interface 145, processor 146, memory 147, camera 148, sensors 149, and display 150, all in communication with each other. Network interface 145 allows computer 130 to connect to one or more networks 180. Network interface 145 may include a wireless network interface, a modem, and/or a wired network interface. Processor 146 allows computer 130 to execute computer readable instructions stored in memory 147 in order to perform processes discussed herein. Camera 148 may capture images or video. Sensors 149 may generate motion and/or orientation information associated with computer 130. Sensors 149 may comprise an inertial measurement unit (IMU). Display 150 may display digital images and/or videos. Display 150 may comprise a touchscreen display. Although the model depicted for computer 130 comprises a laptop, computer 130 can also take the form of a desktop, workstation, kiosk, smart phone, portable digital assistant (PDA), or tablet device. Components of computer 130 may be removed, added, or replaced as necessary for this context.

In some embodiments, various components of computer 130 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, computer 130 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may infer the intent of a person interacting with the computing device (e.g., that the end user has performed a particular gesture in order to control the computing device). Though various mobile devices have been depicted herein, the disclosed technology may also be practiced using workstations, desktop PCs, and other non-mobile computing systems.

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In some embodiments, a computer, such as computer 130, may be in communication with a server in the cloud, such as server 160, and may provide to the server authentication information (e.g., a password associated with an end user of the mobile device) and/or user identification information (e.g., an alphanumeric user identifier) associated with the end user. In response, the server may transmit to the mobile device security protected data accessible by the end user.

Additionally, computer 130 may be used by a user to access portlets (or other user interface components) via a web browser and to make queries regarding time-varying attributes. The user may also view reports of the queried data regarding time-varying attributes on display 150 through a web browser or other appropriate application.

Figure 2A:
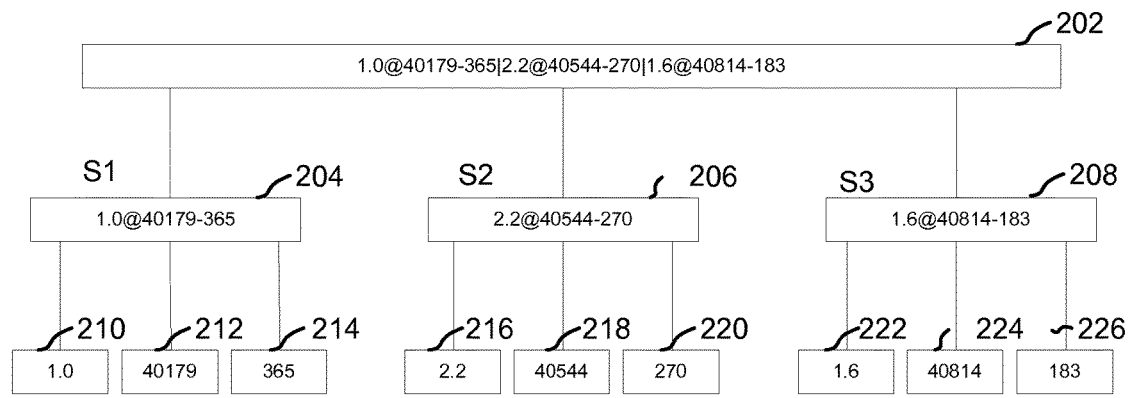
FIG. 2A depicts one embodiment of a character large object representing a time-dependent attribute.

FIG. 2A depicts an exemplary curve and its constituent parts represented as a CLOB. The CLOB 202 is a string of characters representing a time-varying attribute. A CLOB can be shorter or longer than CLOB 202 as necessary to represent data appropriately. Elements of a CLOB can be rearranged, removed, or replaced as necessary to represent data appropriately. In one example, if an employee is available to perform work at an availability rate of 8 hours per day for the first four days of a week, 4 hours per day for Friday, and 0 hours per day during the weekend, then a CLOB may comprise the text string "1@Monday-Thursday|0.5@Friday|0@Saturday-Sunday," where the characters "|" and "@" are used as delimiters. In another example, a CLOB may comprise the text string "R1@45464-5,45467-5|R2@45469-5," where multiple time periods with a common rate (e.g., R1) may be combined (e.g., the time periods 45464-5 and 45467-5, each corresponding with a five digit Julian start date and the period difference in days). This compact text representation may help to minimize overall text length and therefore reduce the memory space of a CLOB.

As depicted, CLOB 202 comprises segments 204-208. These segments correspond with the sequences of characters in CLOB 202 that are separated by delimiters (e.g., the characters "|" and "@"). Segments 204-208 each demarcate continuous periods of time over which the time-varying attribute is constant. That is, the quantity of the attribute being measured may vary among segments, but does not vary within a segment. However, in some cases, a segment may correspond with a linear or non-linear function over a specified period of time. Segments 204-208 represent segments S1-S3 in FIG. 2B, respectively.

Elements 210-214 represent the parts of segment 204, elements 216-220 represent the parts of segment 206, and elements 222-226 represent the parts of segment 208. Elements 210, 216, and 222 represent the rate of the time-varying attribute for their respective segments. For example, suppose that the time-varying attribute represented by CLOB 202 is a number of hours in a week that employee E dedicates to a certain project P, normalized to 20 hours. In this case, element 210 (1.0) represents 20 hours per week, element 216 (2.2) represents 44 hours per week, and element 222 (1.6) represents 32 hours per week. Elements 212, 218, and 224 represent the start dates of their respective segments. As depicted, the start date may be represented as a Julian date, however, other representations of time are possible. Thus, segment S1 began on day 40179 of the Julian calendar, segment S2 began on day 40544 of the Julian calendar, and segment S3 began on day 40814 of the Julian calendar. Elements 214, 220, and 226 represent the durations of their respective segments. While the duration depicted here is in days, other timescales, such as hours, minutes, seconds, and weeks can be used. Thus, segment S1 lasted for 365 days, segment S2 lasted for 270 days, and segment S3 lasted for 183 days. Summarizing the above information, Employee E worked on Project P for 20 hours per week for the 365 days starting on day 40179 of the Julian calendar, 44 hours per week for the 270 days starting on day 40544 of the Julian calendar, and 32 hours per week for the 183 days starting on day 40814 of the Julian calendar. The segments S1, S2, and S3 depicted herein begin one after another. As will be shown in FIG. 2B, this is not necessarily the case, and gaps may exist between segments.

Figure 2B:
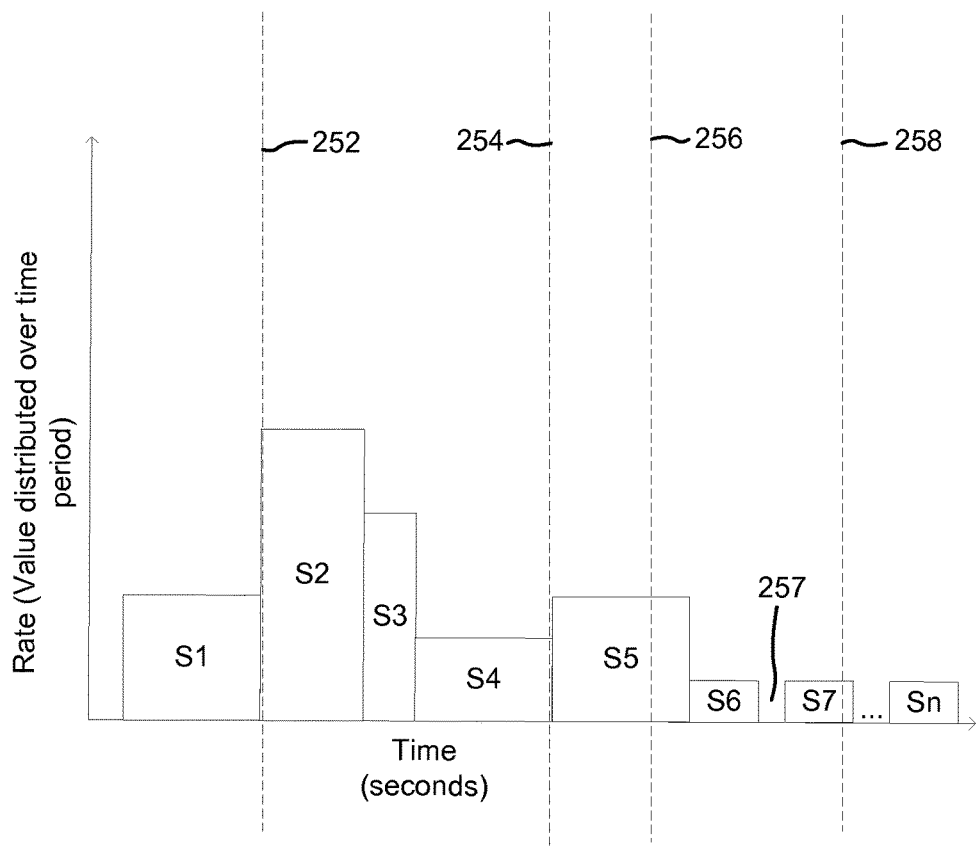
FIG. 2B depicts one embodiment of a sequence of segments of a time-dependent attribute.

FIG. 2B is a graph depicting a series of segments representing a time-dependent attribute. Each segment (S1 through Sn) has a width which represents the duration of time over which the segment is recorded and a height which represents the rate of the attribute, which in some embodiments is the total value of the attribute in the segment divided by the duration. While the duration of time for the segments depicted herein is measured in seconds, in various embodiments, time can be measured in minutes, hours, days, decades, or some other unit of time. As explained above, the quantitative information represented by segments S1-S3 is described in FIG. 2A.

Dashed lines 252, 254, 256, and 258 represent points in time. For example, suppose the user wishes to learn the total value of the attribute over the time between dashed lines 252 and 254. When the user submits a query for this information, the system sums the product of the height and width for each of S2, S3, and S4. Suppose instead that the user wishes to learn the total value of the attribute over the time between dashed lines 256 and 258. When the user submits a query of this information, the system sums the area of a section of S5, S6, and a section of S7. The section of S5 added to the total in this scenario ranges over the duration between the dashed line of 256 and the finish time of S5. The section of S7 added to the total in this scenario ranges over the duration between the start time of S7 and dashed line 258. There is a gap 257 between the finish time of S6 and the start time of S7. Gap filling may be performed in order to determine an appropriate set of values for gap 257. In one embodiment, the gap 257 may be treated as if the rate over this duration is 0 (zero), thus adding nothing to a sum that includes part or all of gap 257. In other embodiments, a substitute value may be determined for the gap 257. In one example, the substitute value may be assigned a default value or a default rate value that has been specified by an end user of the system. In another example, the substitute value may be determined based on an average of values associated with adjacent segments to the gap.

In other embodiments, a substitute rate of the attribute may be assumed for the duration of gap 257, such as the (weighted or unweighted by length) average of the segments on either side of the gap or the (weighted or unweighted) average of the rate over the duration queried by the user. In one example, when a calculation spans a time period including a portion of gap 257, then gap filling may generate a substitute value equal to a weighted average of the two segments adjacent to the gap 257.

In one example, suppose that the attribute is the amount of time (hours/week) Employee E dedicates to Project P, as discussed above. Thus, the height of segment S1 multiplied by the length of S1 yields the amount of time which Employee E dedicated to Project P during the time ranged by S1. If the amount of time that Employee E dedicated to Project P is represented in seconds, then converting from seconds to hours may be calculated by dividing the amount of time worked in seconds by 3600.

Figure 3:
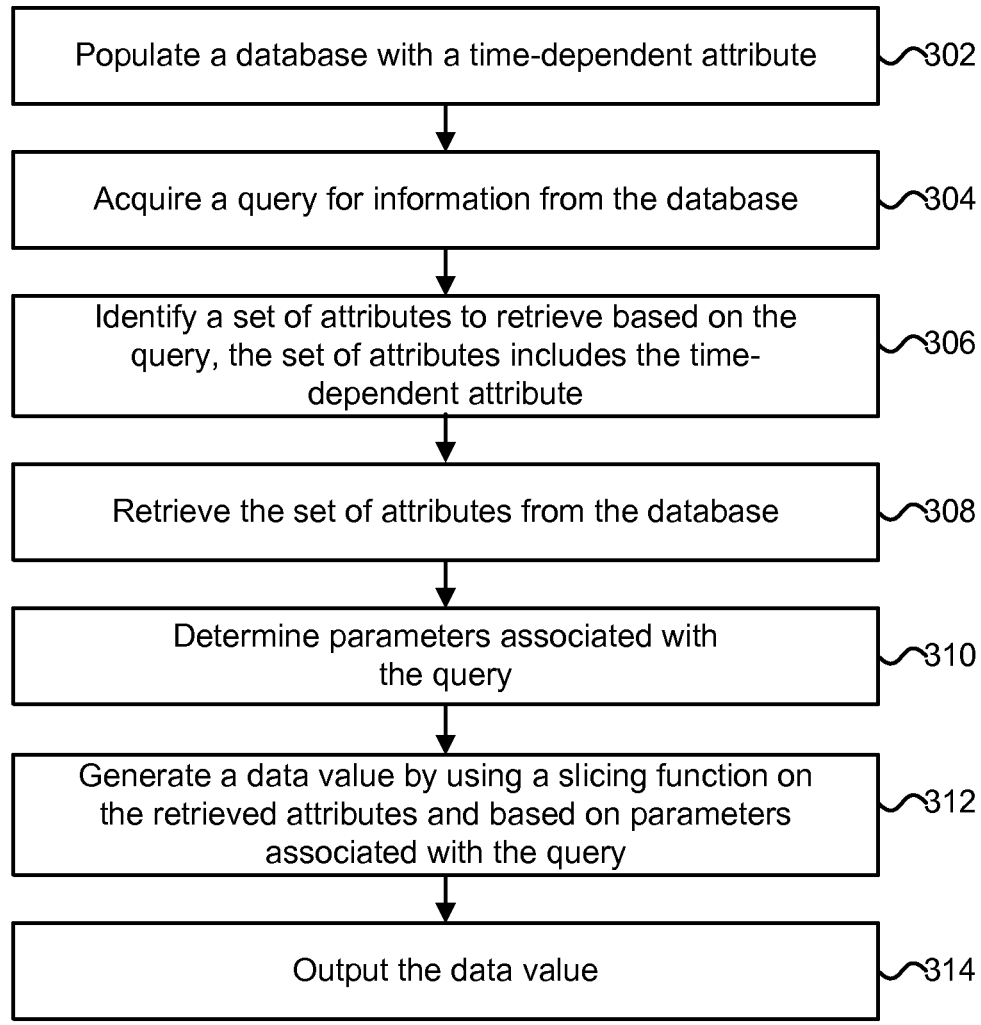
FIG. 3 is a flowchart describing one embodiment of a process for obtaining data pertaining to a time-dependent attribute.

FIG. 3 depicts one embodiment of a process for obtaining data pertaining to a time-dependent attribute using a system. In step 302, the system populates a database (such as an SQL database) with a time-dependent attribute. This data may correspond with segments (e.g., such as the segments depicted in FIGS. 2A and 2B). In step 304, which may occur at any time after step 302, the system acquires a query for information from the database. The query may be manually submitted by a user or automatically by another system or computing application. In step 306, the system identifies a set of attributes to retrieve based on the query. The set of attributes includes the time-dependent attribute. The system can identify the set of attributes by parsing the submitted query and/or applying mapping functions to portion of the submitted query. For example, a response to a query may require a calculation based on three different time-dependent attributes stored in the database. Given the set of attributes identified in step 306, in step 308, the system retrieves this set of attributes from the database, including the time-dependent attribute added to the database in step 302.

In step 310, the system determines parameters associated with the query. In some embodiments, step 310 may be performed before step 306 or step 308. The parameters may include specifications for functions to be applied to data associated with the time-dependent attribute or the inputs (or arguments) for the functions. Given the attributes retrieved in step 308 and the parameters determined in step 310, in step 312, the system generates a data value using a slicing function. The slicing function may take as an input a CLOB (or other text string describing a curve) and apply a segmenting function that converts the CLOB into a plurality of segments. The plurality of segments may be passed to a summing function that aggregates data values corresponding with various time periods. In some cases, the slicing function may be called with a CLOB and a calendar that describes the date periods for which to provide a slice. One embodiment of a process for generating a data value using a slicing function is described later in reference to FIG. 5. In step 314, the system outputs the data value generated in step 312. The data value may be outputted to a display, such as display 150 in FIG. 1, or to a computing device, such as computer 130 in FIG. 1. In some embodiments, the system may output multiple data values in step 314. The data value output in step 314 may be viewed by a user in a report or used by another system for further processing.

Figure 4:
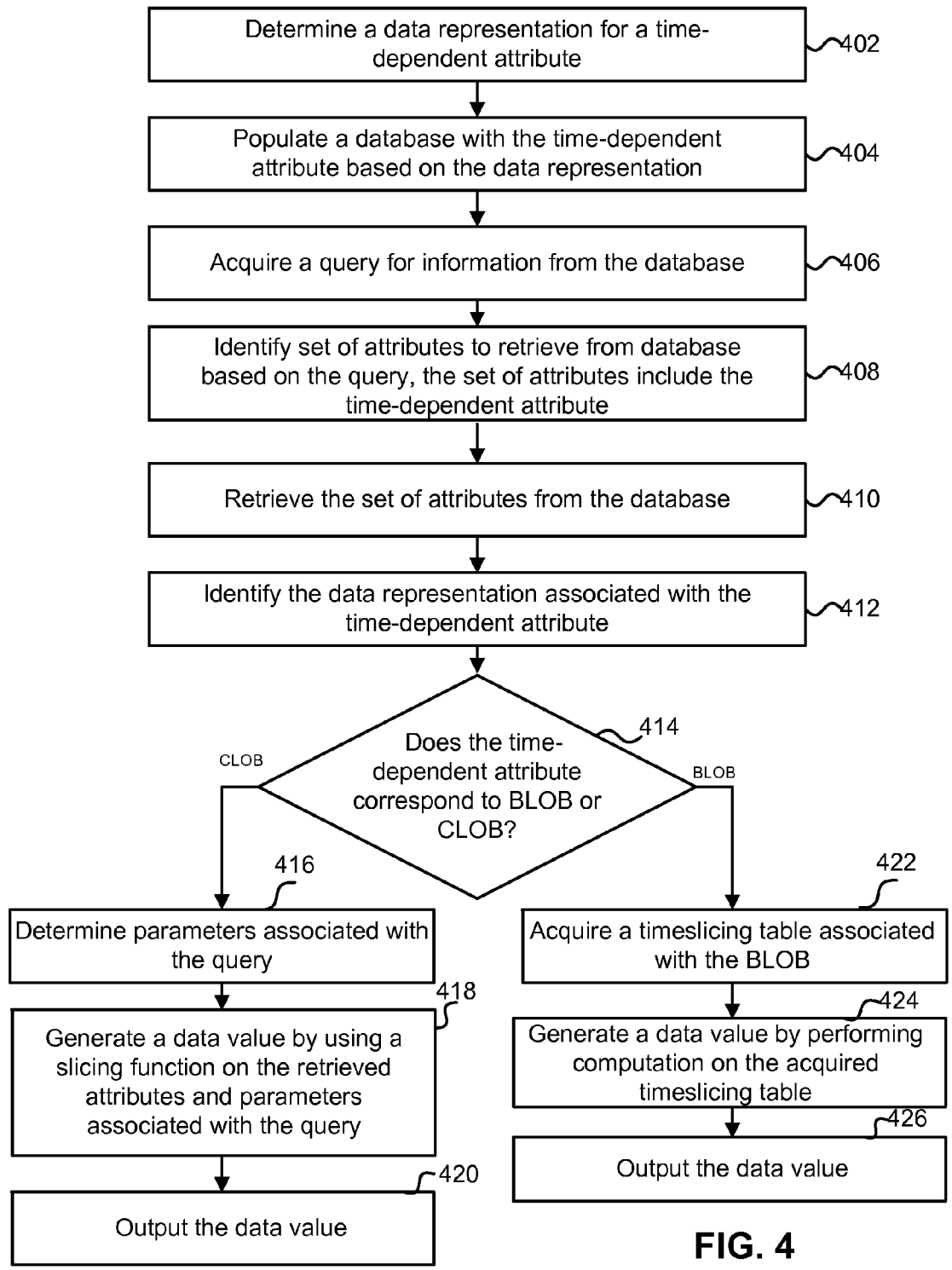
FIG. 4 is a flowchart describing an alternative embodiment of a process for obtaining data pertaining to a time-dependent attribute.

FIG. 4 depicts one embodiment of a process for obtaining data pertaining to a time-dependent attribute. The process of FIG. 4 may be used as an alternative to the process of FIG. 3. In step 402, the system determines a data representation appropriate for a time-dependent attribute to be populated in a database. The data representation may comprise a BLOB or CLOB. The system may account for computational resources such as memory, space, time, etc. when determining the data representation (BLOB or CLOB) for the time-dependent attribute. As mentioned above, storing data in a timeslicing table (and thus represented by a BLOB) can involve overhead. If the set of data is not sufficiently large (and thus the overhead is not significantly amortized), then storing the set of data in this way can be costly in terms of computational resources. While obtaining data from timeslicing tables might involve an operation of looking up data in a pre-defined time period, updating information in timeslicing tables may be slow and inefficient. On the other hand, processing queries in an SQL framework for large sets of data can be inefficient, meaning that there is a tradeoff to be managed.

In one embodiment, the data representation may comprise a CLOB if a historical rate of data updates for the time-dependent attribute is above a threshold (e.g., data updates for the time-dependent attribute occur every five minutes) or a BLOB if the historical rate of data updates for the time-dependent attribute is below the threshold.

In some embodiments, the system may determine the data representation for the time-dependent attribute based on a user command. If sufficient resources are available, the system may determine multiple data representations (e.g., both BLOB and CLOB) for the time-dependent attribute. In some embodiments, the data representation for the time-dependent attribute may be based on the data representation for an existing time-dependent attribute, in case populating the database entails updating old data or fixing invalid data. In step 404, the system populates the database with the time-dependent attribute based on the data representation determined in step 402.

In steps 406-410, as in steps 304-308 of FIG. 3, the system acquires a query for information from the database, identifies a set of attributes (including the time-dependent attribute) based on the query, and retrieves the set of attributes from the database. In step 412, the system identifies the data representation associated with the time-dependent attribute. In some embodiments, the time-dependent attribute is stored in the database along with a digital signature that the system uses to determine the data representation associated with the time-dependent.

In step 414, the system decides how to proceed based on whether the time-dependent attribute is represented by a BLOB or a CLOB. If the time-dependent attribute is represented by a CLOB, then the system performs steps 416-420, which correspond to steps 310-314. If the time-dependent attribute is represented by a BLOB, then in step 422, the system acquires a timeslicing table, or a section thereof, associated with the BLOB. As explained earlier, the system may use a BLOB to populate a timeslicing table. In one example, the time-dependent attribute may relate to a resource allocation curve that is used to populate (or generate) multiple timeslicing tables. Each of the multiple timeslicing tables may correspond with a different granularity (e.g., year, month, week, day) and a different number of time periods. In step 424, the system performs a computation on the acquired timeslicing table to generate a data value. The computation of step 424 may take the form of a method in Java or some other programming language. In step 426, the system outputs the generated data value.

Figure 5:
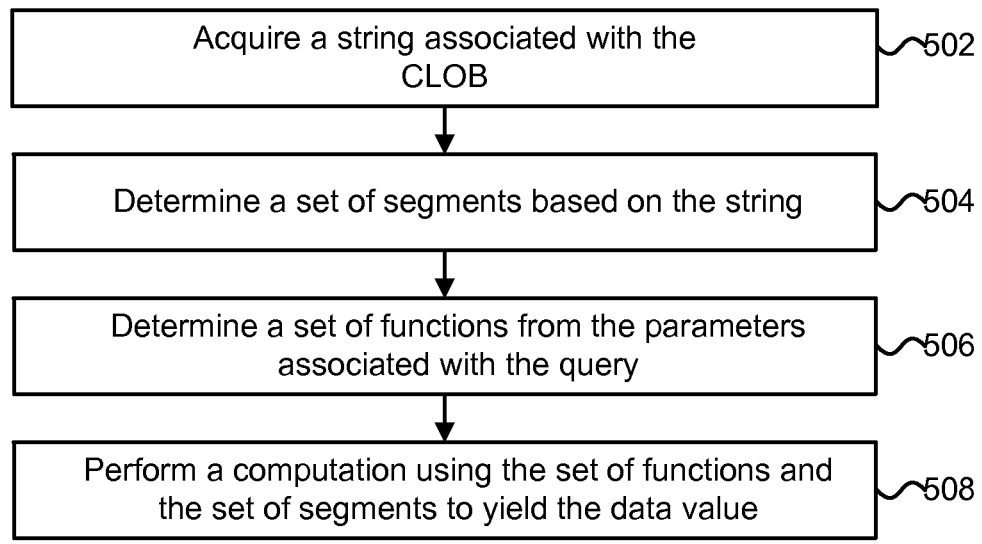
FIG. 5 is a flowchart depicting one embodiment of a process for performing a slicing function in order to generate a data value.

FIG. 5 depicts a process for performing a slicing function in order to generate a data value. The process described in FIG. 5 is one example of a process for implementing step 312 in FIG. 3 or for implementing step 418 in FIG. 4. In step 502, the system acquires a string of characters associated with the CLOB. Depending on the form of the CLOB, the system may have to manipulate the CLOB to obtain a data structure appropriate for further processing. In step 504, the system determines a set of segments based on the string. In one example, the set of segments may comprise a subset of S1 through Sn as depicted in FIG. 2B. In step 506, the system determines a set of functions from the parameters associated with the query. For example, if the query is submitted in SQL, then the system must parse the query both for the time-dependent attribute to be retrieved and the functions to be performed on the data associated with the time-dependent attribute. In step 508, the system performs a computation using the set of functions determined in step 506 and the set of segments determined in step 504 to yield the data value. Segments in the set of segments may serve as arguments to functions in the set of functions.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   storing a plurality of timeslicing tables corresponding with a time-dependent attribute in a database, the plurality of timeslicing tables includes a first timeslicing table corresponding with the time-dependent attribute over a first time period and a second timeslicing table corresponding with the time-dependent attribute over a second time period, the plurality of timeslicing tables includes a third timeslicing table corresponding with the time-dependent attribute over a third time period;
   detecting a data update to the time-dependent attribute within the first time period;
   determining a historical rate of data updates associated with the time-dependent attribute over the first time period and the second time period;
   detecting that the historical rate of data updates associated with the time-dependent attribute over the first time period and the second time period is greater than an updating threshold;
   replacing the first timeslicing table and the second timeslicing table within the database with a character large object representation for the time-dependent attribute over the first time period and the second time period in response to detecting that the historical rate of data updates associated with the time-dependent attribute over the first time period and the second time period is greater than the updating threshold;
   acquiring a query for one or more data values associated with the time-dependent attribute;
   retrieving the third timeslicing table corresponding with the time-dependent attribute from the database in response to acquiring the query, the third timeslicing table corresponding with the time-dependent attribute over the third time period is stored as a binary large object within the database;
   retrieving the character large object representation for the time-dependent attribute over the first time period and the second time period from the database in response to acquiring the query, the character large object representation for the time-dependent attribute over the first time period and the second time period is stored as a character large object within the database;
   generating a plurality of segments using the character large object representation for the time-dependent attribute;
   determining the one or more data values associated with the time-dependent attribute using the plurality of segments and the third timeslicing table; and
   outputting the one or more data values associated with the time-dependent attribute.

2. The method of claim 1, wherein:
   the determining the one or more data values comprises identifying a gap based on the plurality of segments and determining a substitute value for the gap, the determining the one or more data values comprises determining the one or more data values based on the substitute value.

3. The method of claim 1, wherein:
   the time-dependent attribute comprises a time scale varying attribute; and
   the plurality of segments includes a non-linear segment.

4. The method of claim 1, further comprising:
   determining a historical rate of data accesses associated with the time-dependent attribute over the first time period and the second time period; and
   the replacing the first timeslicing table and the second timeslicing table within the database with the character large object representation for the time-dependent attribute over the first time period and the second time period comprises replacing the first timeslicing table and the second timeslicing table within the database with the character large object representation based on the historical rate of data updates associated with the time-dependent attribute and the historical rate of data accesses associated with the time-dependent attribute over the first time period and the second time period.

5. The method of claim 1, further comprising:
   acquiring new data corresponding with the time-dependent attribute over a fourth time period;
   determining a data representation for the time-dependent attribute over the fourth time period; and
   storing the new data using the data representation for the time-dependent attribute over the fourth time period within the database.

6. The method of claim 5, wherein the determining a data representation for the time-dependent attribute comprises:
   determining a first metric associated with a first set of computing resources for making the data representation for the time-dependent attribute a binary large object, the first metric comprises at least one of a memory usage metric or a processor usage metric;
   determining a second metric associated with a second set of computing resources for making the data representation for the time-dependent attribute a character large object; and
   determining the data representation based on the first metric and the second metric.

7. The method of claim 1, wherein:
   the plurality of segments represents quantities of the time-dependent attribute over certain periods of time.

8. The method of claim 1, wherein:

the character large object representation comprises a text string that includes a first field associated with a rate of a segment of the plurality of segments, a second field associated with a start time of the segment, and a third field associated with a duration of the segment.

9. The method of claim 8, wherein:

the start time is represented as a Julian date.

10. The method of claim 1, wherein:

the plurality of segments includes a first segment and a second segment, the determining the one or more data values comprises adding a product of a rate of the first segment and a fraction of a duration of the first segment to the product of a rate of the second segment and a fraction of a duration of the second segment.

11. The method of claim 1, wherein:

the time-dependent attribute represents a resource available to an enterprise.

12. A system, comprising:

a storage device configured to support a database for storing data, the storage device configured to store a plurality of timeslicing tables corresponding with a time-dependent attribute, the plurality of timeslicing tables includes a first timeslicing table corresponding with the time-dependent attribute over a first time period and a second timeslicing table corresponding with the time-dependent attribute over a second time period, the plurality of timeslicing tables includes a third timeslicing table corresponding with the time-dependent attribute over a third time period;

a query interface; and a processor configured to detect a data update to the time-dependent attribute within the first time period and determine a historical rate of data updates associated with the time-dependent attribute over the first time period and the second time period, the processor configured to detect that the historical rate of data updates associated with the time-dependent attribute over the first time period and the second time period is greater than an updating threshold, the processor configured to replace the first timeslicing table and the second timeslicing table with a character large object representation for the time-dependent attribute over the first time period and the second time period in response to detecting that the historical rate of data updates associated with the time-dependent attribute over the first time period and the second time period is greater than the updating threshold, the processor configured to acquire a query for one or more data values associated with the time-dependent attribute from the query interface, the processor configured to retrieve the third timeslicing table corresponding with the time-dependent attribute from the database in response to the query and retrieve the character large object representation for the time-dependent attribute over the first time period and the second time period from the database in response to the query, the character large object representation for the time-dependent attribute over the first time period and the second time period is stored as a character large object within the database and the third timeslicing table corresponding with the time-dependent attribute over the third time period is stored as a binary large object within the database, the processor configured to generate a plurality of segments using the character large object representation for the time-dependent attribute and determine the one or more data values associated with the time-dependent attribute using the plurality of segments and the third timeslicing table, the processor configured to output the one or more data values associated with the time-dependent attribute.

13. The system of claim 12, wherein:

the processor identifies a gap based on the plurality of segments and determines a substitute value for the gap based on a default value, the processor generates the one or more data values based on the substitute value.

14. The system of claim 12, wherein:

the time-dependent attribute comprises a time scale varying attribute; and the plurality of segments includes a non-linear segment.

15. A computer program product, comprising:

a non-transitory computer readable storage medium having computer readable program code embodied therewith, the computer readable program code comprising:

computer readable program code configured to store a plurality of timeslicing tables corresponding with a time-dependent attribute in a database, the plurality of timeslicing tables includes a first timeslicing table corresponding with the time-dependent attribute over a first time period and a second timeslicing table corresponding with the time-dependent attribute over a second time period, the plurality of timeslicing tables includes a third timeslicing table corresponding with the time-dependent attribute over a third time period;

computer readable program code configured to detect a data update to the time-dependent attribute within the first time period and determine a historical rate of data updates associated with the time-dependent attribute over the first time period and the second time period;

computer readable program code configured to detect that the historical rate of data updates associated with the time-dependent attribute over the first time period and the second time period is greater than an updating threshold;

computer readable program code configured to consolidate and replace the first timeslicing table and the second timeslicing table within the database with a character large object representation for the time-dependent attribute over the first time period and the second time period in response to detecting that the historical rate of data updates associated with the time-dependent attribute over the first time period and the second time period is greater than the updating threshold;

computer readable program code configured to acquire a query for one or more data values associated with the time-dependent attribute;

computer readable program code configured to retrieve the third timeslicing table corresponding with the time-dependent attribute from the database in response to the query and retrieve the character large object representation for the time-dependent attribute over the first time period and the second time period from the database in response to the query; and computer readable program code configured to generate a plurality of segments using the character large object representation for the time-dependent attribute and generate the one or more data values associated with the time-dependent attribute using the plurality of segments and the third timeslicing table, the character large object representation for the time-dependent attribute over the first time period and the second time period is stored as a character large object within the database and the third timeslicing table corresponding with the time-dependent attribute over the third time period is stored as a binary large object within the database.

16. The computer program product of claim 15, wherein the computer readable program code further comprises:
computer readable program code configured to identify a gap based on the plurality of segments;
computer readable program code configured to determine a substitute value for the gap based on a weighted average of a subset of the plurality of segments adjacent to the gap; and
computer readable program code configured to generate one or more data values based on the substitute value.

* * * * *